3 Sheets—Sheet 1.

J. GIBBONS.

Assignor to the MENEELY HARDWARE COMPANY.

CAR AXLE OILER.

No. 10,644. Reissued Sept. 8, 1885.

WITNESSES:

Geo. A. Darby.

Charles S. Brintnall

John Gibbons INVENTOR

BY

W. E. Hagan his ATTORNEY

N. PETERS, Photo-Lithographer, Washington, D. C.

3 Sheets—Sheet 2.

J. GIBBONS.

Assignor to the MENEELY HARDWARE COMPANY.

CAR AXLE OILER.

No. 10,644. Reissued Sept. 8, 1885.

WITNESSES:

Geo. A. Darby.

Charles S. Brinthall

John Gibbons INVENTOR

BY

W. E. Hagan his ATTORNEY

N. PETERS. Photo-Lithographer, Washington, D. C.

J. GIBBONS.

Assignor to the MENEELY HARDWARE COMPANY.

CAR AXLE OILER.

No. 10,644. Reissued Sept. 8, 1885.

WITNESSES:

Stanley M. Holden,

Charles S. Rintoul

INVENTOR

John Gibbons,

BY

M. Hagan his ATTORNEY

N. PETERS, Photo-Lithographer, Washington, D. C.

UNITED STATES PATENT OFFICE.

JOHN GIBBONS, OF WEST TROY, NEW YORK, ASSIGNOR TO THE MENEELY HARDWARE COMPANY.

CAR-AXLE OILER.

SPECIFICATION forming part of Reissued Letters Patent No. 10,644, dated September 8, 1885.

Original No. 311,893, dated February 10, 1885. Application for reissue filed June 15, 1885.

*To all whom it may concern:*

Be it known that I, JOHN GIBBONS, of the village of West Troy, county of Albany, State of New York, have invented a new and useful Improvement in Oilers for Car-Axles, of which the following is a specification.

My invention relates to oilers for car-axles, and has for its object to improve their construction and to render them more efficient for the use for which they are designed.

My invention relates more particularly to a mechanical means for holding a wick, waste, or other oil-absorbing and oil-distributing substance in contact with the car-axle, and which mechanism is adapted to be inserted in or be removed from the car-axle box without a reconstruction of the latter to adapt it to such use of an oiler mechanism.

My invention consists (as will be more fully detailed in connection with its illustration) in the combination of a two-part frame, the lower part of which is constructed to rest in the bottom of the car-axle box, and the upper part of the frame hinged to the lower part at the front with an intermediately-placed spring arranged adjacently to where hinged, and a wick or waste holder that is hung to and between the sides of the upper part of the frame by means of pivots or trunnions, the said frame as thus constructed being adapted to be inserted in or drawn out from the axle-box.

Accompanying this specification, to form a part of it, there are three sheets of drawings, containing four figures, illustrating my invention, with the same designation of parts by letter-reference in all of them.

Figure 1:
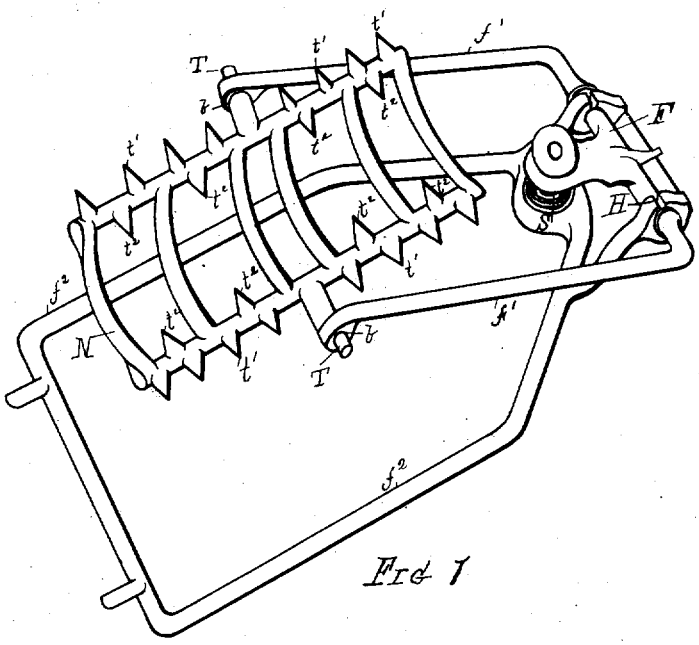
Figure 2:
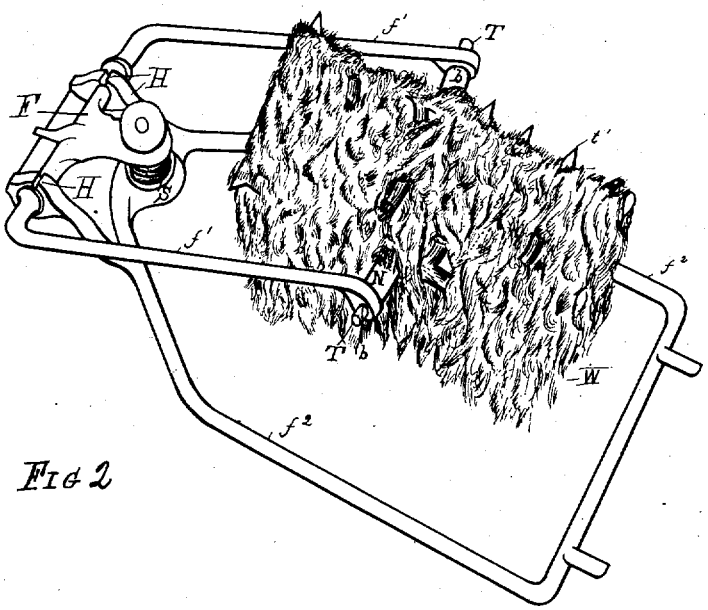
Figure 3:
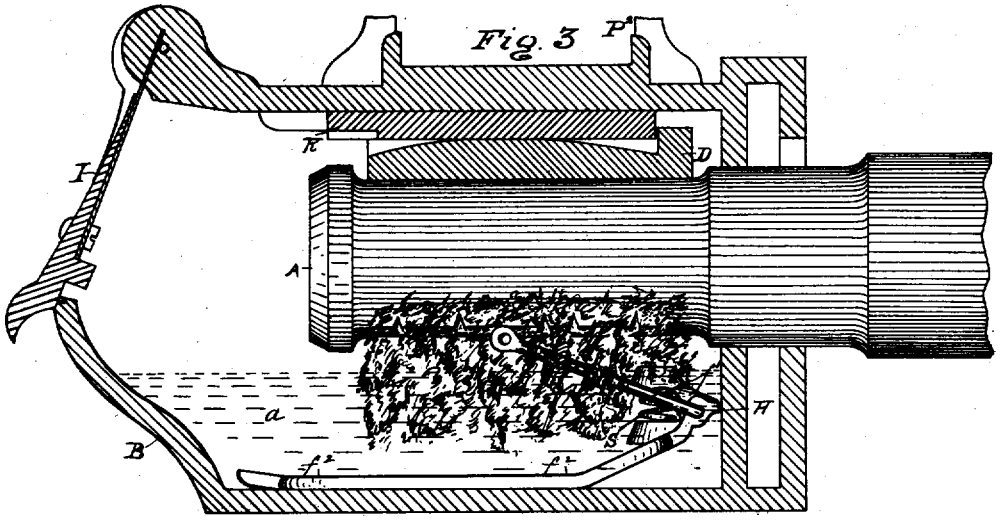
Figure 4:
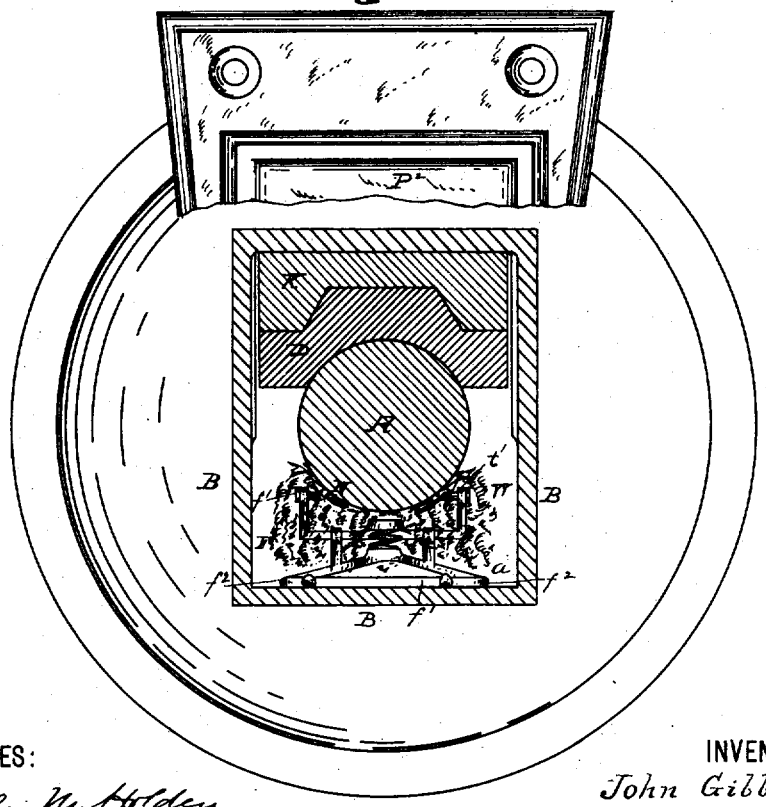

Figure 1 shows a perspective of the mechanism, shown as removed from the car-axle box and the wick or waste omitted. Fig. 2 shows a view in perspective of the mechanism as removed from the car-axle box, with the wick or waste applied thereto. Fig. 3 illustrates the mechanism as applied to the car-axle box, with its hinged end at the rear of the latter, and with the adjacent parts of the car-axle box shown in longitudinal vertical section, and the applied mechanism, wick, and car-axle illustrated in side elevation. Fig. 4 is a cross vertical section taken through the axle-box, axle, the wick or waste holder, the frame, and the wick, with the hinged end of the mechanism at the rear.

The several parts of the mechanism containing my invention, and those of a car-axle box with which my invention is constructed to cooperate, are designated by letter-reference, and the function of the parts is described as follows:

The letter A designates the car-axle; B, the car-axle or journal box. D indicates the bearing; C, the axle-collar; I, the journal-box cover; $P^2$, the pedestal-jaw, and K the journal-bearing key.

The letter F designates a wick or waste holding frame, made with the upper part, $f'$, and the lower part, $f^2$. The upper and lower parts of the frame thus indicated are hinged together at one end, as designated at H, and the letter S indicates a spiral spring that is placed between the two parts of the frame adjacently to where they are hinged. As thus constructed, the two parts of the frame are forced together against and are spread apart by the recoil force of said spring.

The letter N indicates a wick or waste holder, the sides of which are provided with outer teeth, $t'$, and inner teeth, $t^2$, and the sides of this holder are constructed with trunnions T, that pivot in bearings $b$ $b$ in the ends of the upper part of the frame, (indicated at $f'$,) so that said holder is made adjustable therein.

The letters W designate the wick or waste, which is placed on the holder N, so as to be there held by the teeth $t'$ and $t^2$, with a portion of the wick or waste extending down over the sides of the holder so as to be in the oil or lubricant in the bottom of the journal-box, as indicated at $a$ of Figs. 3 and 4.

The device thus constructed is used in the following manner: The wick or waste being applied to the holder N, as shown at Fig. 2, the two parts $f'$ $f^2$ of the frame are forced together against the force of the spring S, and, being held as thus placed, are inserted in the journal-box or axle-box through the opening inclosed by the cover I, with the hinged part of the frame at the front or rear, as may be desired, and the holder N, with the wick or waste thereon, immediately beneath the axle, oil having been supplied to the journal-box.

The mechanism being thus placed, the spring S forces upwardly the upper part, $f'$, of the frame, which brings the waste or wick on the holder N in contact with the axle, the holder being by means of its trunnions, while thus pressed upwardly toward the axle, adjustable thereto, while the wick or waste on the holder, absorbing oil or lubricant from its connection with the latter in the bottom of the journal-box, distributes it to the axle.

I am aware that in Letters Patent No. 301,880, dated July 15, 1884, and granted to G. R. Meneely and myself, there is described and claimed a two-part frame as a part of an oiler, the two parts being shown and described as hinged at their sides, and the upper part of the frame constructed with a rigid wick-holder, the latter being provided with teeth at the sides to hold the wick.

While I have shown the mechanism as inserted within the axle-box with the hinged end of the frame toward the rear, yet it is preferably applied with the hinged end of the frame toward the front of the axle-box.

I am aware that my improvement herein is limited to a two-part frame hinged together at the adjacent ends of each part as an improvement on the device shown in said older patent, and to the combination, with a two-part frame hinged to each other, of a wick or waste holder adjustably attached to the upper part of the frame.

While I have shown the wick-holder herein as having vertical passages through it, if desired, said holder may be made with a pan form having a closed bottom, the inner row of teeth being dispensed with, and the said holder pivotally attached to the upper part of the frame, so as to be adjustable to the axle in substantially the same manner.

Having thus described my invention, what I claim, and desire to secure by Letters Patent, is—

1. In an oiler for a car-axle, the combination of a two-part wick-holder frame, the parts hinged to each other at one end, a spring between the two parts of the frame adjacently to where hinged, and a wick or waste holder on the upper part of the frame, said parts being constructed and arranged to operate substantially as and for the purposes set forth.

2. In a car-axle oiler, the combination of a two-part frame, said parts being hinged together at one end, a spring between said parts of the frame adjacently to where thus hinged, and an oil or wick holder constructed to have a pivotal connection with the upper part of said frame, said parts being constructed and arranged to operate in the manner substantially as and for the purposes set forth.

3. In a car axle oiler, the combination of a two-part wick-frame, said parts being hinged together at one end, a spring between said parts of the frame adjacently to where hinged, and a wick-holder adjustably pivoted to the upper part of said frame, said wick-holder being made with teeth on the inner and outer edges of its sides, said parts being constructed and arranged to operate substantially in the manner as and for the purposes set forth.

Signed at Troy, New York, this 8th day of April, 1885, in the presence of the two witnesses whose names are hereto written.

Witnesses: JOHN GIBBONS.

PETER V. HASKELL,

CHARLES S. BRINTNALL.